United States Patent [19]

Stockel

[11] 4,309,494
[45] Jan. 5, 1982

[54] ELECTROCHEMICAL CELL HAVING BATTERY SEPARATOR OF ETHYLENE-VINYL ALCOHOL COPOLYMER

[76] Inventor: Richard F. Stockel, 475 Rolling Hills Rd., Bridgewater, N.J. 08807

[21] Appl. No.: 148,598

[22] Filed: May 12, 1980

Related U.S. Application Data

[63] Continuation of Ser. No. 39,671, May 15, 1979, abandoned.

[51] Int. Cl.³ ............................................. H01M 2/16
[52] U.S. Cl. ..................................... 429/254; 429/251
[58] Field of Search ...................... 429/254, 251, 249; 252/62.3 Q

[56] References Cited

U.S. PATENT DOCUMENTS

| | | | |
|---|---|---|---|
| 3,573,106 | 3/1971 | Johnson et al. | 429/254 X |
| 3,875,270 | 4/1975 | Hoefner et al. | 429/254 X |
| 3,967,978 | 7/1976 | Honda et al. | 429/254 |
| 4,085,241 | 4/1978 | Sheibley | 429/254 X |
| 4,109,066 | 8/1978 | Dick et al. | 429/254 X |
| 4,134,837 | 1/1979 | Yamashita et al. | 210/500 M |
| 4,143,218 | 3/1979 | Adams et al. | 429/254 |

*Primary Examiner*—Charles F. Lefevour
*Attorney, Agent, or Firm*—Ronald G. Goebel

[57] ABSTRACT

There is disclosed a battery with a separator of ethylene-vinyl alcohol copolymer. Inert filler and plasticizer can be used. The separator can be used in acid or alkaline electrolyte.

5 Claims, No Drawings

ELECTROCHEMICAL CELL HAVING BATTERY SEPARATOR OF ETHYLENE-VINYL ALCOHOL COPOLYMER

This is a continuation, of application Ser. No. 39,671 filed May 15, 1979 now abandoned.

This invention is directed to a battery separator and to the method of making such. One aspect of this invention is related to a novel battery separator of excellent physical and chemical properties which is comprised of a microporous sheet of an ethylene/vinyl alcohol copolymer. A second aspect is that it relates to a microporous sheet consisting of a copolymer of ethylene/vinyl alcohol and/or an inert filler material and/or plasticizer.

Battery separators are porous diaphragms placed between the positive and negative plates of a battery so that the electrolyte forms the sole internal conducting path between them. Generally, separators have ribs on the side presented to the positive plate and are flat on the side presented to the negative plate. It is generally considered to be desirable in the battery separator art to employ the smallest possible pore size since this reduces the danger of active materials being forced through or growing through the separator, hereby causing shorting between the plates thereof or other detrimental effects. Also, a separator should have a relatively low electrical resistance.

The battery separator disclosed in this invention can be employed as a separator for the lead/acid battery or any of the alkaline type batteries, such as nickel/zinc or the silver/cadmium battery. A separator for the acid type batteries has been described previously as having or being comprised of a sheet or web with ribs on at least one side of the separator. For the alkaline type of battery, the separator is usually a thin sheet or film. The method of this invention may be used to form separators for any of the batteries which employ an acid or an alkaline type electrolyte. While the technical published literature, as well as the literature of the U.S. Patent Office, is replete with numerous publications pertaining to battery separators, none have disclosed the unique balance found between a hydrophobic olefin and a hydrophilic vinyl alcohol copolymer, as described in this invention. Some examples in the patent literature concern cellophane with a grafted polymer U.S. Pat. No. 3,330,702; cellulosic material or paper coated with a resin U.S. Pat. No. 3,893,871 and 3,976,502; cellophane with a grafted copolymer U.S. Pat No. 3,330,702; methacrylic acid-divinyl benzene copolymer U.S. Pat. No. 3,684,580; phenol-resorcinol-formaldehyde resin U.S. Pat. No. 3,475,355; and polyacrylamide U.S. Pat. No. 3,018,316. Several examples of a polyolefin-homo or copolymer film with fillers are U.S. Pat. Nos. 3,870,586; 3,955,014; 3,985,580; and Pat. No. 4,024,333. The use of polytetrofluoroethylene is described in U.S. Pat. No. 3,475,222 and Pat. No. 3,661,645, while other polyvinyl compositions are found in U.S. Pat. Nos. 3,585,081; 3,766,106; 3,875,270 and 3,907,601. Silicone rubber-vinyl copolymer is still yet another example of a battery separator described in U.S. Pat. No. 3,585,081.

The battery separator of this present invention comprises a porous sheet of a olefin-vinyl alcohol copolymer in which the olefin portion should be of a linear type polymer with a minimal or no branch sites. The actual molecular weight of the polymer is, therefore, not as crucial as is described for a polyolefin microporous battery separator in U.S. 3,351,495. It is now recognized that by certain types of polymerization, one is able to obtain essentially a linear polyolefin. The vinyl alcohol content of the copolymer should be greater than 20%, however, less than 90%. The vinyl alcohol is generally prepared by hydrolyzing the vinyl acetate portion of the copolymer, usually under alkaline conditions. The degree of hydrolysis should be greater than 88%, and preferably at the 99.7% level for optimum results. A copolymer of choice in this invention can be prepared by a number of polymerization techniques, such as random polymerization of ethylene and vinyl acetate followed by hydrolysis to form the vinyl alcohol, or it can be formed by grafting polyvinyl alcohol onto ethylene during polymerization, or it can be formed by block polymerization techniques, or by using Ziegler-Natta catalysts. The manner in which this copolymer can be formed is not a limitation of this invention, and anyone familiar with recent polymerization techniques would be skilled in the art and could prepare this copolymer by a number of techniques reported in the literature. Another advantage of this copolymer is that by having sufficient hydroxyl groups present in the backbone of the copolymer, you can lessen or even eliminate the need for filler and/or plasticizer, which accounts for the porosity found in the common type or the more conventional type of polyolefin battery separators.

A further embodiment of this battery separator invention comprises a linear or near linear ethylene fraction and a fully hydrolyzed vinyl alcohol fraction (at least to the extent of 99.7%) comprising the copolymer. The compositions of this copolymer can utilize from 0 to 60 volume percent filler material and 0 to 10 volume percent plasticizer. It has been found that with certain copolymer compositions these additives can be drastically reduced or totally eliminated. The precise formulation depends on the required porosity that the application calls for. One can also add from 1 to 10% of the antioxidant to lessen any autoxidation that occurs in actual size.

The microporous battery separators of this invention have a pore size which is usually less than one micron in diameter, preferably the mjaority of the pores have a diameter of 0.5 micron.

According to this invention, the battery separator is produced by one of several processes. One way is to blend a composition of the ethylene vinyl alcohol copolymer from 10 to 65 volume percent with from 0 to 60% of an inert filler material and the volume percent difference between the total amount of the copolymer, the inert filler and 100% being a plasticizer. Said composition can be formed into a sheet. This is followed by subsequently extracting from such sheet, by means of a suitable solvent, at least a portion of the compound selected from the group consisting of the inert filler and the plasticizer. A second type process, where filler and plasticizer are not required or are present at very low levels, would not involve the extraction step. This is where the hydroxyl content of the copolymer is sufficiently high. Preferably, the copolymer should have at least 40% up to 90% by weight of vinyl alcohol content. This resulting battery separator retains sufficient mechanical strength, yet forms a porous film or sheet due to the presence of sufficient polyvinyl alcohol in the copolymer which swells in the aqueous electrolyte.

The film or sheet battery separator can be prepared by extruding the polymer material through a die and forming a film or sheet by one of several techniques. These techniques can include a plastic sheet extrusion followed by a chill roll casting, or a belt casting technique, or a compression molding, or injection molding, or solution casting, or calendering. Blown film techniques, such as the bubble process, is still yet another manner in which a battery separator can be formed. This represents the most economical method of preparing a battery separator if little or no filler and/or plasticizer is required. This latter blown film process is dependent on the amount of vinyl alcohol present in the copolymer. Compositions of 40–90% vinyl alcohol content are required when the bubble process is to be used.

Another advantage to our invention is the fact that the copolymer can be crosslinked to improve the physical and mechanical properties, such as tensile strength, modulus and tear strength, by crosslinking the hydroxyl group with diisocyanates, either aromatic or aliphatic, with hydroxylmethyl phenolics, hydroxymethyl melamines, epoxies, as well as being treated with oxidants like periodate. Other known crosslinking agents can also be employed. In all cases, crosslinking to the extent of $\frac{1}{4}$ to 10% will form sufficiently strong film or sheet, which can withstand the environmental conditions found in actual use of either acid or alkaline batteries. This invention produces a unique and novel microporous battery separator which meets minimum electrical resistance requirements and possesses acceptable tensile strength and porosity.

The battery separator can be provided with rib members. These members can be formed from any number of polymeric compositions known in the art. For example, they can be formed from the same composition as that of the battery separator or from such materials as other polyolefin, polyvinyl chloride, as well as filled and/or foamed compositions thereof. Alternatively, the sheet can be grooved or embossed to provide ribs. In still another alternative, a rib of the above prescribed character is applied to a portion of the embossing or on the flat portion of the side beside the up thrust portion.

In forming the battery separator of the present invention, the polymeric mixture can be blended with a suitable siliceous filler, if so desired. The filler will be added for one of two reasons in this present invention, and they are: reducing the cost and/or for introducing more porosity when needed. However, when the present invention has a suitable amount of hydroxyl groups present from the vinyl alcohol portion of the copolymer, it is found that the filler is not necessary, or at least greatly reduced in quantity. Some examples of fillers are silica, mica, talc, glass particles, diatomaceous earth and etc. In addition to siliceous materials, other fillers can be carbon black, coal dust, graphite, metal oxides and hydroxides, metal carbonates and zeolites, Portland cement, alumina, titanium dioxide, or barium sulfate. Many other fillers are also known in the state of the art, and, consequently, are not precluded from this invention as long as they satisfy the desirable characteristics such as cost reduction leading to a relatively non-brittle sheet and/or film and yielding a substantial porosity in the final battery separator. Sometimes it is desirable to incorporate a small amount of a commercially available wetting agent. However, it has been found, in this invention, that this is not a prerequisite.

The plasticizer of this invention, if required, can improve the processability of the composition by lowering the melt viscosity or reducing the amount of power input which is required to compound and to fabricate the composition. When a plasticizer is used in the compounding, it should be relatively easy to remove it from the polymer-filler-plasticizer composition. It is also useful in imparting porosity to the battery separant. Plasticizers can be either of a water soluble or water insoluble type. Examples of water insoluble plasticizers are organic esters such as phthalates, sebacates, stearates, adipates and citrates. Other water insoluble materials such as epoxidized vegetable oil, phosphate esters or hydrocarbon materials can be used. Examples of water soluble plasticizers are ethylene glycol, polyethylene glycol, polypropylene glycol, glycerol and ethers and esters thereof. When using a plasticizer, it is absolutely essential to remove almost the theoretical amount which was incorporated before a satisfactory separator can be utilized. Depending on the composition of the ethylene vinyl alcohol copolymer, either a water insoluble plasticizer, when the ethylene component is greater than 70%, or a water soluble plasticizer, when the vinyl alcohol component is about 40%, or a combination of both types is also desirable.

The preferred ranges for the components employed in forming the battery separator described in this invention depend on the amount of ethylene/vinyl alcohol ration of the copolymer. When the hydrophobic part is in great excess with only a minor amount of the hydrophilic portion, then significantly more filler and plasticizer is required. The preferred range of the polymer is from 10 to 60 volume percent, while the preferred range of the filler is from 10 to 60 percent, and the preferred range of plasticizer makes up the difference to give the total amount of 100%. On the other extreme, where more than 40% of the copolymer is the hydrophilic part, then the amount of filler and plasticizer can actually be very close to zero. For example, a material of 20% polyethylene and 80% polyvinyl alcohol has sufficient porosity that filler and plasticizer are not requirements. However, due to the wide variability of this unique material, it is virtually impossible to conduct all of the experiments necessary to find all the optimum conditions at every copolymer ratio. However, certain guidelines have been found experimentally, and will be shown in the examples of this invention.

The separator of the present invention may be made in any thickness desired for a particular end use. Most commercial separators range from about 15 to 50 mils in thickness. Separators of the present invention may range in thickness between about 5 to 50 mils and preferably from 5 to 15 mils. If ribs are employed, they may be any height conventionally employed, generally from about 15 to 200 mils.

The following specific examples illustrate various aspects of this unique and novel invention, but are not to be construed as limiting the scope of the invention beyond that set forth in the claims attached hereto.

EXAMPLE 1

A random copolymer was prepared by polymerizing by free radical means ethylene and vinyl acetate in a weight ratio of 80:20. This was followed by complete hydrolysis by potassium hydroxide to yield the desirable copolymer. This material was added to finely divided silica having an average particle diameter of about 0.02 micron with a surface area of 165 square meters per gram. Using the system described, a composition consisting of 20 volume percent of the copolymer, 20 volume percent of the silica, and 60 volume percent of Shellflex 411, which is a petroleum oil, were mixed in a two roll mill for a period of about 10 minutes and removed in sheet form. After grinding in a Wiley Mill, the composition was fed to the hopper of a one inch extruder which was operating in a speed of 70 rpm at a pressure of 400 psi. Attached to the extruder was an 8 inch sheeting die. The temperature profile, which was progressively spaced along the length of the extruder from the feed end to the die end, was 200° F., 300° F. and 350° F. The extruder was adjusted so as to operate at a speed of approximately 1½ feet per minute. The extruder composition was then immersed in heptane to remove the plasticizer. The thickness of the composition was found to be approximately 35 mils. The extracted sheet was composed of approximately 50 volume percent copolymer and 50% of silica. The resulting separator has acceptable electrical resistance and was found to have desirable tensile strength, tear resistance and significant pore volume. The pore diameter was acceptable.

EXAMPLE 2

The copolymer of this example was a 60/40 ratio of ethylene-vinyl acetate copolymer also formed by free radical polymerization means. This was subsequently hydrolyzed to form the desired hydrophobic/hydrophilic polymer, a composition consisting of 10% by volume of the copolymer, 15% by volume of the silica and 75% by volume of a polyethylene glycol of approximately 4,000 molecular weight. The sheet was prepared in a similar manner, as in Example 1. However, in this case, the extraction was with water rather than an organic solvent. The general characteristics of this battery separator were also very acceptable, and indicated that the porosity was higher with a slight loss in physical properties such as tensile strength and tear strength. Nevertheless, the separator was very satisfactory.

EXAMPLE 3

A copolymer of ethylene-vinyl alcohol was prepared by grafting ethylene onto polyvinyl alcohol. The resulting ratio was 25% by weight of polyethylene and 75% by weight of polyvinyl alcohol. With this composition, the filler was not required to get a significant porosity. However, a very small amount of plasticizer polyethylene glycol was used so that the extrusion could be carried out expeditiously. As expected, the material had a further reduction in physical properties over that in Example 2. Nevertheless, they performed satisfactorally under test conditions, and the resulting battery separator represents an improvement in the sense that filler is not required and the small amount of plasticizer can be removed readily in an aqueous bath. The overall economics of the example is excellent.

EXAMPLE 4

This experiment utilized a copolymer with the composition of 60% by weight ethylene and 40% by weight of vinyl alcohol as described in Example 2. In this case, a separator was prepared with no filler but with about 10% by volume of a polyethylene glycol of approximately 4,000 molecular weight. The material was extruded by using conventional blown film techniques commonly referred to as the bubble process. A very thin plastic sheet, approximately 5 mils, was formed. The sheet was passed through an extraction bath consisting of water to remove the plasticizer. The resulting battery separator, prepared by this tehcnique, represents a significant increase in technology over that employed in the industry. It allows a battery separator to be formed quickly, cheaply and very thin, and yet having the requirements necessary.

EXAMPLE 5

A stereo-specific copolymer of ethylene (60 weight percent) and vinyl acetate (40 weight percent) was prepared by using $\alpha TiCl_3$ and $Al(C_2H_5)_2 Cl$ which is a Ziegler-Natta catalyst. The resulting copolymer was hydrolyzed in aqueous potassium hydroxide to yield the desired copolymer. The degree of hydrolysis was estimated to be very high, approaching 99.7%. By employing a laboratory extruder hooked up to a blown film bubble process, very thin film of 5 mils was obtained which could be used as a battery separator.

It is thus seen that quite a unique and novel and relatively cheap battery separator of superior quality has been disclosed. The battery separator suitable for usage in batteries employing an acid electrolyte, as for example in the lead acid type batteries and also in batteries employing an alkaline electrolyte such as nickel-zinc, silver-zinc, air-zinc, or nickel-cadmium types, has been disclosed. It is to be understood that many equivalent modifications will be apparent to those skilled in the art from a reading of the foregoing disclosure without a departure from the intended concept of the invention. For example, it is clearly understood that the process of this invention will be operated in a continuous manner when in actual production, and that this is within the scope of the invention.

What is claimed is:

1. An electrochemical cell containing an aqueous electrolyte and a separator comprising a microporous sheet having a thickness of from about 5 to 50 mils. of a substantially linear copolymer consisting of ethylene-vinyl alcohol containing from about 40 wt. % to about 90 wt. % combined vinyl alcohol.

2. The electrolytic cell of claim 1 wherein said linear ethylene portion of said copolymer is substantially unbranched.

3. An electrochemical cell containing an aqueous electrolyte and a separator comprising a microporous sheet having a thickness of from about 5 to 50 mils. of a substantially linear copolymer consisting of ethylene-vinyl alcohol wherein the combined vinyl alcohol content is from about 20 wt. % to 90 wt. % and a filler, the amount of copolymer comprising from about 10 to 60 volume % of said sheet and the amount of filler comprising from about 10 to 60 volume % of said sheet.

4. The electrolytic cell of claim 3 wherein said linear ethylene portion of said copolymer is substantially unbranched.

5. An electrochemical cell containing an aqueous electrolyte and a separator comprising a microporous sheet having a thickness of from about 5 to 50 mils. of a substantially linear copolymer consisting of ethylene-vinyl alcohol wherein the combined vinyl alcohol content is from about 20 wt. % to 90 wt. % and a filler, the amount of copolymer comprising from about 10 to 60 volume % of said sheet and the amount of filler comprising from about 10 to 60 volume % of said sheet, said separator being prepared by forming a sheet containing a mixture of said copolymer, said filler and a plasticizer, and removing said plasticizer from said sheet.

* * * * *